United States Patent
Jang

(10) Patent No.: US 10,753,263 B2
(45) Date of Patent: Aug. 25, 2020

(54) EXHAUST DEVICE OF TURBOCHARGED VEHICLE

(71) Applicants: HYUNDAI MOTOR COMPANY, Seoul (KR); KIA MOTORS CORPORATION, Seoul (KR)

(72) Inventor: Chun Soon Jang, Suwon-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/193,403

(22) Filed: Nov. 16, 2018

(65) Prior Publication Data

US 2019/0383197 A1 Dec. 19, 2019

(30) Foreign Application Priority Data

Jun. 15, 2018 (KR) ........................ 10-2018-0068531

(51) Int. Cl.
*F01N 13/00* (2010.01)
*F01N 3/28* (2006.01)

(52) U.S. Cl.
CPC ............. *F01N 13/008* (2013.01); *F01N 3/28* (2013.01); *F01N 2560/025* (2013.01)

(58) Field of Classification Search
CPC ...... B64C 13/042; B64D 31/04; B64D 43/00; F01N 13/008; F01N 2560/025; F01N 3/28; G01C 21/20; G01C 23/00; G04G 21/04; G04G 9/0064; G06F 1/163; G06F 1/1694; G06F 2200/1637; G06F 3/016; G06F 3/017; G07C 5/08; G07C 5/0825; G08B 6/00; H04Q 2209/40; H04Q 9/00
See application file for complete search history.

(56) References Cited

U.S. PATENT DOCUMENTS

| | | | |
|---|---|---|---|
| 8,087,230 B2 * | 1/2012 | Kikuchi | F01N 3/10 60/276 |
| 9,488,090 B2 | 11/2016 | Spengel et al. | |
| 9,551,266 B2 * | 1/2017 | Melecosky | B01D 53/9477 |
| 9,593,612 B2 * | 3/2017 | Takatsu | F01N 13/08 |
| 10,100,704 B2 * | 10/2018 | Zhao | F01N 13/008 |
| 10,309,332 B2 * | 6/2019 | Suzuki | F02D 41/008 |
| 2006/0059683 A1 | 3/2006 | Catalogna et al. | |
| 2016/0327190 A1 * | 11/2016 | Hsing | G01M 15/104 |
| 2017/0159537 A1 * | 6/2017 | Liu | F01N 3/28 |
| 2018/0080364 A1 * | 3/2018 | Yamashita | F01N 13/1811 |
| 2018/0258826 A1 * | 9/2018 | Kuramashi | F01N 3/10 |

FOREIGN PATENT DOCUMENTS

| | | |
|---|---|---|
| JP | 2003-049640 A | 2/2003 |
| JP | 2008-019753 A | 1/2008 |
| KR | 10-0916417 B1 | 9/2009 |

* cited by examiner

*Primary Examiner* — Jesse S Bogue
(74) *Attorney, Agent, or Firm* — Morgan, Lewis & Bockius LLP

(57) ABSTRACT

An exhaust device of a turbocharger vehicle includes: a catalyst converter diagonally arranged in a vertical direction toward the ground as being connected with an outlet of a streamlined exhaust connecting pipe which is bent at 95° or more, wherein the streamlined exhaust connecting pipe is connected between an outlet of a turbocharger and the catalytic converter.

9 Claims, 7 Drawing Sheets

【FIG. 1】
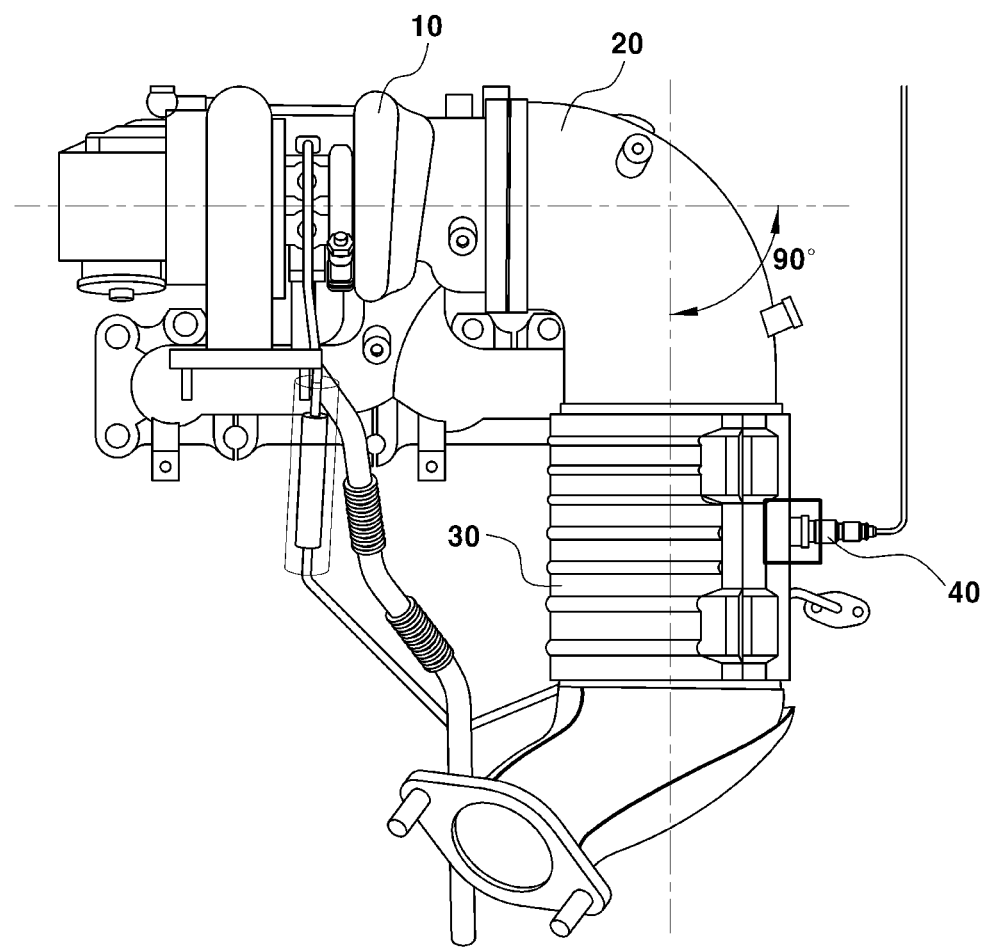
-- PRIOR ART --

[FIG. 2]
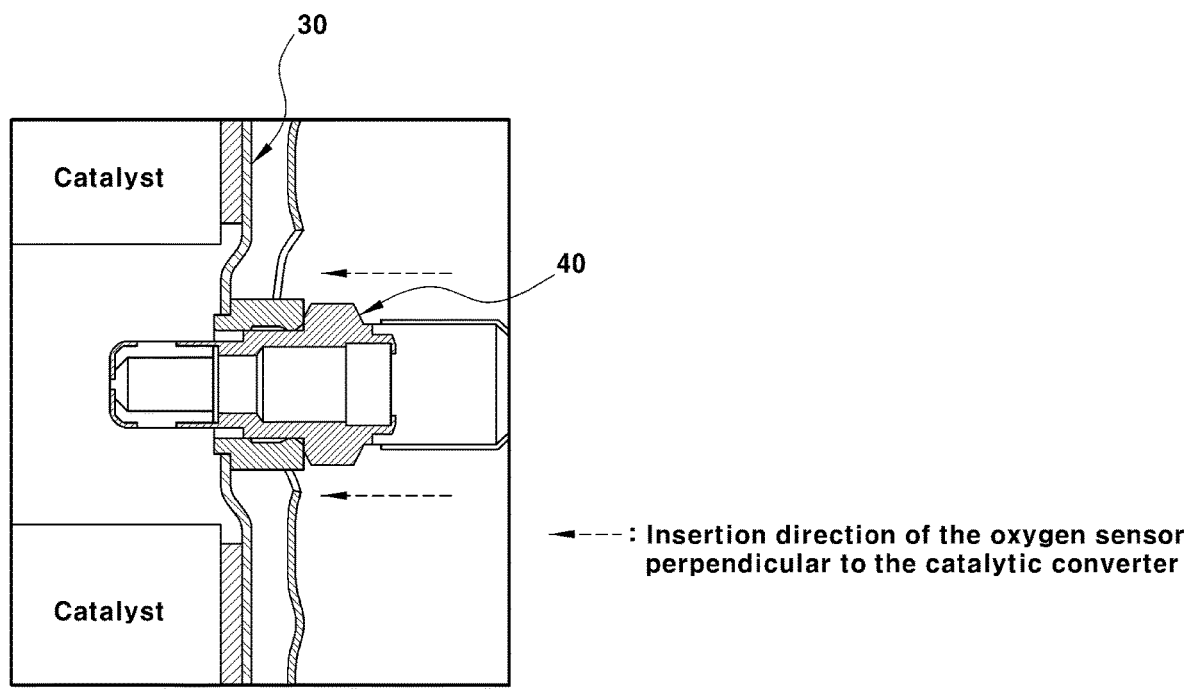
-- PRIOR ART --

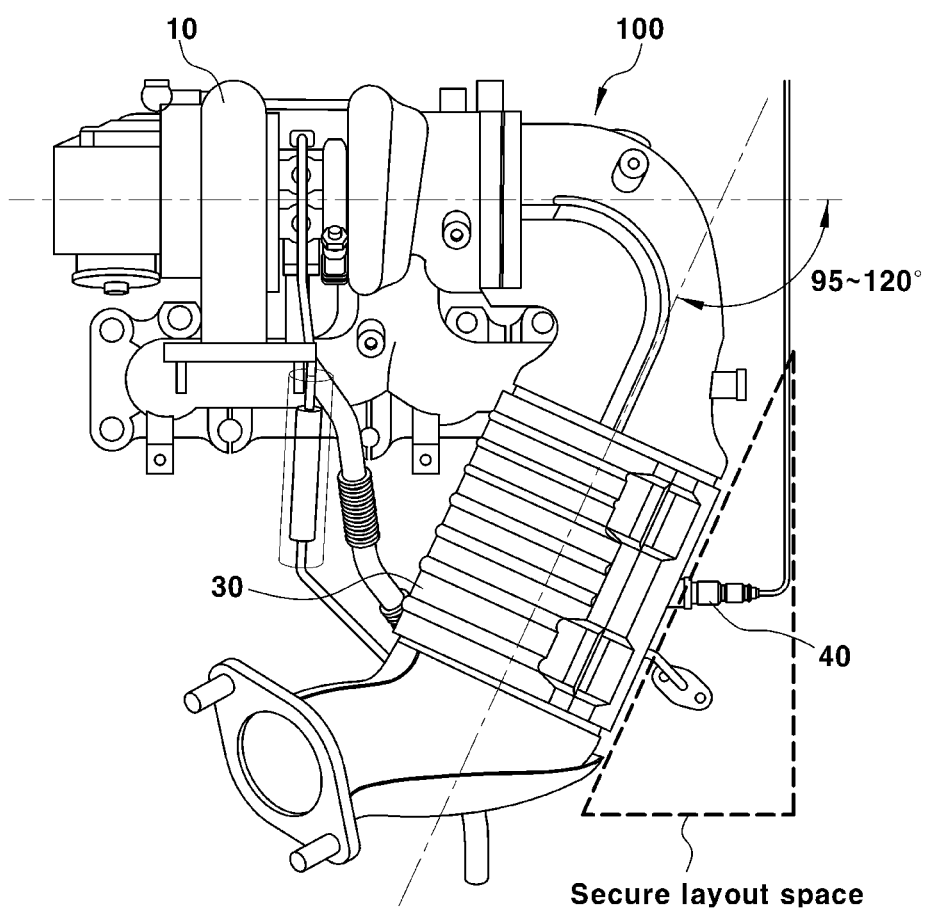

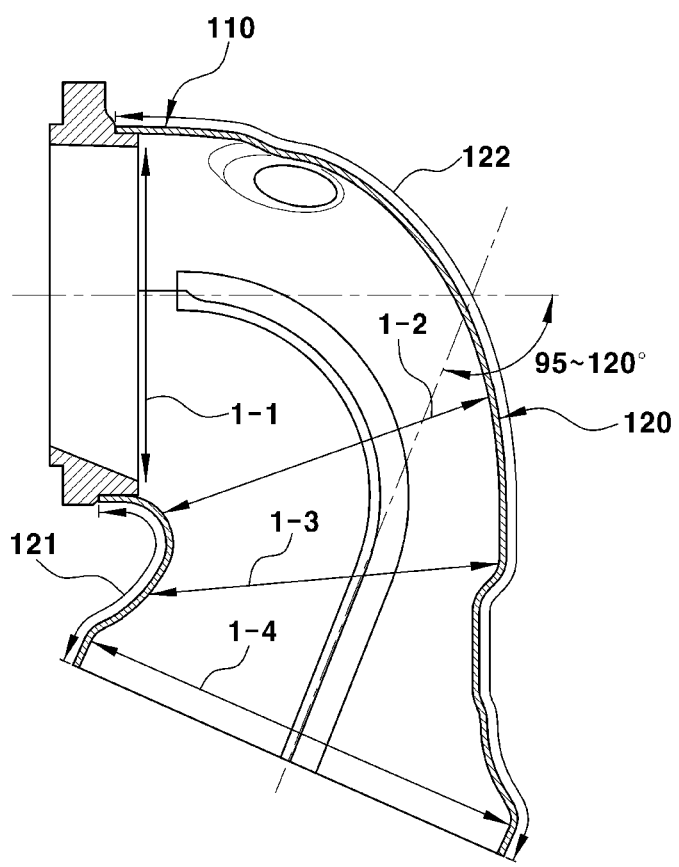
[FIG. 4]

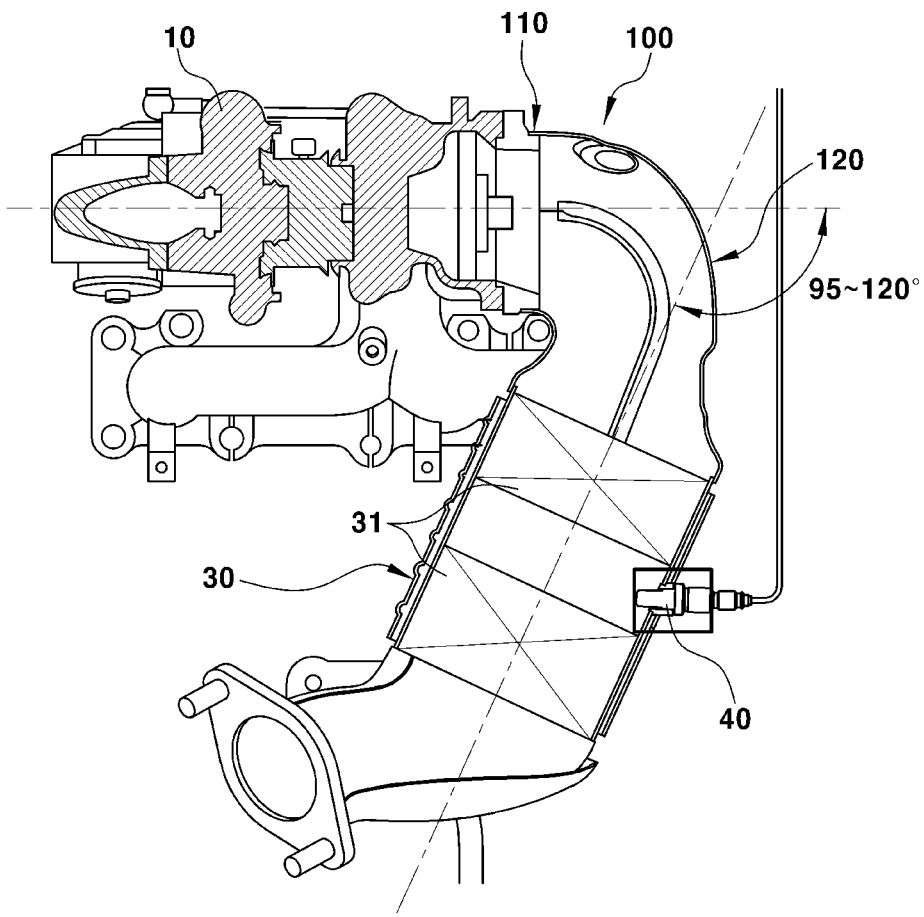

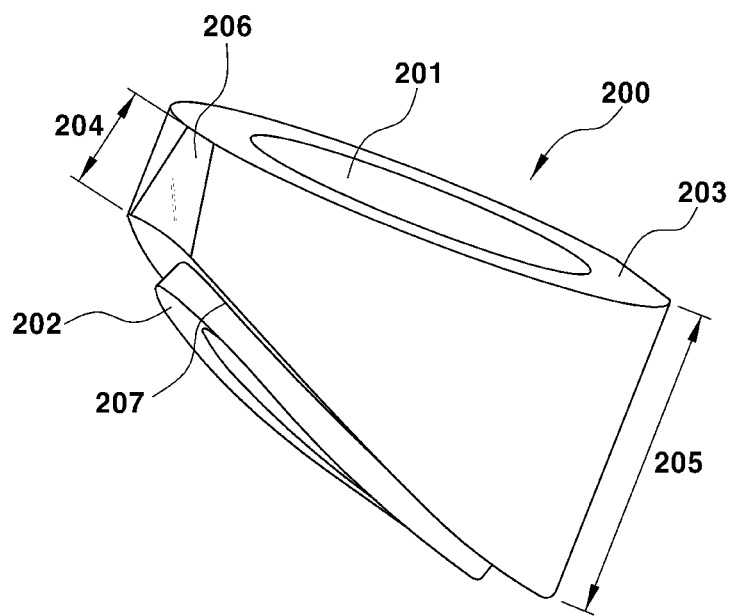
[FIG. 6]

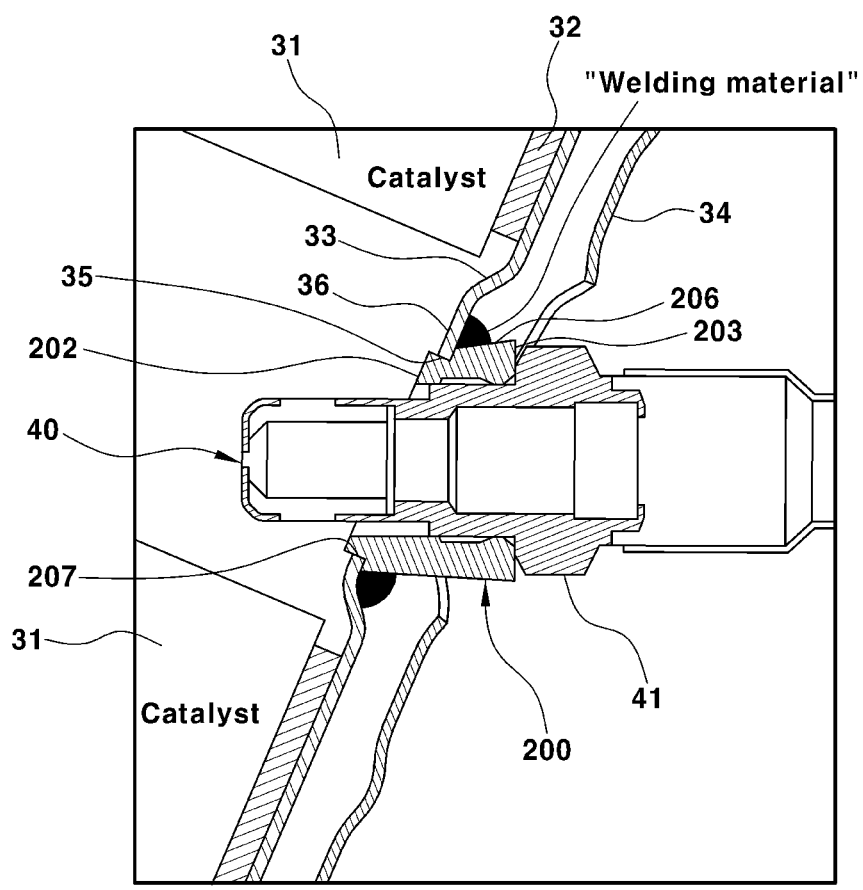

EXHAUST DEVICE OF TURBOCHARGED VEHICLE

CROSS-REFERENCE TO RELATED APPLICATION

This application claims under 35 U.S.C. § 119(a) the benefit of priority to Korean Patent Application No. 10-2018-0068531 filed on Jun. 15, 2018, the entire contents of which are incorporated herein by reference.

TECHNICAL FIELD

The present disclosure relates to an exhaust device of a turbocharged vehicle, and more particularly, to an exhaust device of a turbocharged vehicle having an exhaust connecting pipe which connects an outlet of the turbocharger and a catalytic converter.

BACKGROUND

Generally, a turbocharger mounted on a vehicle improves the charging efficiency of intake air that is flowed into combustion chambers of an engine by using the exhaust gas pressure exhausted to an exhaust system of the engine to pressurize the intake air and has been mainly applied to high-power engines.

In addition, the exhaust system of the turbocharger engine is a post-treatment device with high purification that can effectively oxidize not only CO and HC components contained in the exhaust gas, but also SOF components, and has a warming-up catalytic converter (WCC).

Referring to FIG. 1 showing a conventional exhaust system for a turbocharged vehicle, an exhaust connecting pipe 20 bent at 90° with a constant diameter is connected to an outlet of a turbocharger 10 and a catalyst converter 30 (e.g., a warming-up catalyst converter) is mounted at the outlet of the exhaust connecting pipe 20.

Further, an oxygen sensor 40, which senses oxygen in the exhaust gas to be used to determine the degradation state of the catalyst or to determine the rich or lean of the air/fuel ratio (lambda), is inserted into and mounted to the catalyst converter 30.

As shown in FIG. 2, the oxygen sensor 40 is inserted into and fastened to the catalytic converter 30 to prevent the sensing failure due to the condensate accumulation.

Furthermore, the oxygen sensor 40 is inserted between the catalysts in the catalytic converter, not at the turbocharger outlet of a high temperature, to prevent damage due to abrupt temperature rise.

Since the exhaust connecting pipe 20 should be oriented in the direction of the ground, it is provided to be bent at 90° from the turbocharger arranged in the transverse direction. That is, if the exhaust connecting pipe 20 is bent at an angle exceeding 90°, the exhaust performance is deteriorated (e.g., the exhaust gas pressure is increased), so that the exhaust connecting pipe 20 has been applied to be bent at an angle of 90° in order to minimize the exhaust pressure.

However, there was a disadvantage in that only the catalytic converter 30 having a volume defined by the restriction of the space adjacent to the outlet of the exhaust connecting pipe 20 is connected to the outlet of the exhaust connecting pipe 20 when the exhaust connecting pipe 20 is adopted as being bent at 90°.

Furthermore, since the outlet of the exhaust connecting pipe 20 and the catalytic converter 30 are arranged in line toward the ground direction, the space occupied by the exhaust connecting pipe 20 and the catalytic converter 30 is increased in view of the exhaust system component layout, so that the layout of the exhaust system components for a high performance turbo engine of a large size is limited.

In addition, when the exhaust connecting pipe 20 bent at an angle exceeding 90° is adopted, the catalytic converter 30 connected to the outlet of the exhaust connecting pipe 20 is in a diagonal arrangement, which causes the problems that the oxygen sensor 40 cannot be easily inserted straight into the catalytic converter 30 and the sensing performance of the oxygen sensor 40 is degraded because the insertion fastening length of the oxygen sensor 40 for the catalytic converter 30 is not ensured.

The above information disclosed in this Background section is only for enhancement of understanding of the background of the disclosure, and therefore, it may contain information that does not form the prior art that is already known in this country to a person of ordinary skill in the art.

SUMMARY OF THE DISCLOSURE the present disclosure has been made to solve the above problems and the object thereof is to provide an exhaust device of a turbocharged vehicle, in which one side space of an exhaust connecting pipe and catalytic converter can be secured as a layout space of exhaust system parts by improving the exhaust connecting pipe structure connecting an outlet of a turbocharger and the catalytic converter to a streamlined pipe structure bent at 95° or more from the outlet of the turbocharger toward the ground direction, so that the exhaust connecting pipe and the catalytic converter are arranged to be inclined toward the ground, and also, which can easily fasten an oxygen sensor by improving a boss structure for fastening an oxygen sensor which is inserted into and fastened to a catalytic converter.

According to an exemplary embodiment of the present disclosure, an exhaust device of a turbocharged vehicle includes a catalyst converter diagonally arranged in a vertical direction toward the ground as being connected with an outlet of a streamlined exhaust connecting pipe which is bent at 95° or more, the streamlined exhaust connecting pipe is connected between an outlet of a turbocharger and the catalytic converter.

The streamlined exhaust connecting pipe may comprise an inlet pipe horizontally connected with the outlet of the turbocharger; and a bent pipe bent at 95° or more from the inlet pipe toward the ground direction.

The streamlined exhaust connecting pipe may comprise an inlet pipe horizontally connected with the outlet of the turbocharger; and a bent pipe bent in the range of 95° to 120° from the inlet pipe toward the ground direction.

The streamlined exhaust connecting pipe may be provided in an enlarged pipe shape of which the cross-sectional area is gradually increased from the inlet pipe to the distal end portion of the bent pipe.

A boss for fastening an oxygen sensor of which an interior surface is processed into a diagonal line is mounted on an oxygen sensor mounting position of the catalytic converter to ensure the insertion and fastening of the oxygen sensor in the liner direction with respect to the oxygen sensor mounting position of the catalytic converter.

The boss for fastening the oxygen sensor may be formed in a cylindrical shape with an oxygen sensor fastening hole; an interior surface thereof may be formed with a diagonal processed surface processed at the same angle as the diagonal arrangement an angle of the catalytic converter; and an exterior surface thereof may be formed with a horizontal support surface which a stopper for limiting the insertion length of the oxygen sensor is closely contacted to and supported by.

A minimum length area may be formed at one side of the outer diameter portion of the boss for fastening the oxygen sensor; and a maximum length may be formed at the other side of the outer diameter portion of the boss for fastening the oxygen sensor due to the diagonal processed surface of the boss for fastening the oxygen sensor.

A slanted surface for length increase slanted downwardly along the direction from the exterior surface toward the interior surface may be further processed at the minimum length area.

An insertion hole may be formed at a shell of the catalytic converter into which the boss for fastening the oxygen sensor is inserted; and a peripheral end portion of the insertion hole may be inwardly concavely formed as much as the thickness a mat to increase the insertion length of the oxygen sensor inserted into the catalytic converter.

A stepped groove caught by the peripheral end portion of the catalytic converter may be further formed at the outer diameter surface facing to the inner surface of the boss for fastening the oxygen sensor.

Through the above-mentioned task solution means, the present disclosure may provide the following effects.

First, the exhaust connecting pipe connecting the outlet of the turbocharger and the catalytic converter is applied as a streamlined exhaust connecting pipe which is bent at 95° or more from the outlet of the turbocharger toward the ground direction, so that the catalytic converter connected to the outlet of the streamlined exhaust connecting pipe can be arranged in a diagonal arrangement toward the ground direction, thereby securing one side of the streamlined exhaust connection pipe and catalyst converter more widely and utilizing the widely secured space as the layout space of exhaust system components.

Second, the streamlined exhaust connecting pipe is bent at 95° or more, and the exhaust gas backpressure can be reduced by applying a structure in which cross-section area gradually increase toward the catalytic converter side.

Third, it is possible to easily fasten the oxygen sensor to the catalytic converter by improving the boss structure for fastening the oxygen sensor fastened to the catalytic converter arranged to be inclined toward the ground to the structure that the oxygen sensor can easily fasten in the linear direction, and also, to easily secure the insertion fastening length of the oxygen sensor, thereby ensuring the sensing performance.

With this reduced emission, the present disclosure achieve considerable cost reduction by lowered precious metal and reduced converter assembly from 2 to 1. And this can also achieve weight reduction by reduced converter assay.

Other aspects and exemplary embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given herein below by way of illustration only, and thus are not limitative of the present disclosure, and wherein:

FIG. 1 is a schematic diagram illustrating an exhaust device of a conventional turbocharged vehicle;

FIG. 2 is a schematic diagram illustrating a structure in which an oxygen sensor is mounted on the exhaust device of the conventional turbocharged vehicle;

FIG. 3 is a top view showing an exhaust device of a turbocharged vehicle according to an exemplary embodiment of the present disclosure;

FIG. 4 is a cross-sectional view of a streamlined exhaust connecting pipe of the exhaust device of the turbocharged vehicle according to an exemplary embodiment of the present disclosure;

FIG. 5 is a cross-sectional view showing the exhaust device of the turbocharged vehicle according to an exemplary embodiment of the present disclosure;

FIG. 6 is a perspective view showing a boss for fastening an oxygen sensor in the configuration of the exhaust device of the turbo charger vehicle according to an exemplary embodiment of the present disclosure;

FIG. 7 is an enlarged cross-sectional view showing the structure of the oxygen sensor of the exhaust device of the turbocharged vehicle according to an exemplary embodiment of the present disclosure; and It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

In the whole description, it will be understood that when a component is referred to as being "comprising" any component, it does not exclude other components, but can further comprises the other components unless otherwise specified.

FIG. 3 is a top view showing an exhaust device of a turbocharged vehicle according to the present disclosure, and a reference numeral 100 indicates a streamlined exhaust connecting pipe.

The streamlined exhaust connecting pipe 100 may be connected between the outlet of a turbocharger 10 arranged along the width direction of the vehicle and a catalytic converter 30.

Particularly, the streamlined exhaust connecting pipe 100 may be adapted to be bent at an angle of 95° or more toward the ground direction from the outlet of the turbocharger 10 arranged along the width direction of the vehicle, or may be bent in a range of 95° to 120°.

The reason why the streamlined exhaust connecting pipe 100 is bent into a range of 95° or more, or more specifically 95° to 120° range, is to secure an exhaust system layout space.

More specifically, the streamlined exhaust connecting pipe 100 may be bent to a range of 95° or more, for example, 95° to 120° range, so that the catalytic converter 30 connected to the outlet of the streamlined exhaust connecting pipe 100 forms a diagonal arrangement as shown in FIG. 3, thereby increasing the length direction volume of the catalytic converter as well as securing a wider layout space for the exhaust system parts at one side space of the catalytic converter.

If the bending angle of the streamlined exhaust connecting pipe 100 exceeds 120°, the exhaust gas exhaust performance due to the exhaust flow resistance may be deteriorated (for example, the exhaust gas pressure may rise), so that the bending angle of the streamlined exhaust connecting pipe 100 does not exceed 120°.

FIG. 4 is a cross-sectional view showing the streamlined exhaust connecting pipe according to an exemplary embodiment of the present disclosure, and FIG. 5 is a cross-sectional view showing the exhaust device of the turbocharged vehicle according to an exemplary embodiment of the present disclosure.

The streamlined exhaust connecting pipe 100 may be configured to be bent at 95° or more, for example, 95° to 120° range, but because the outlet of a turbocharger 10 is arranged in the vehicle width direction, the portion the fastened portion to the outlet of the turbocharger 10 should be applied as a horizontal structure to the outlet of the turbocharger 10.

Here, the streamlined exhaust connecting pipe 100 may be divided into an inlet pipe 110, which is horizontal and connected with the outlet of the turbocharger 10, and a bent pipe 120, which is bent at 95° or more, more specifically in the range of 95° to 120° from the inlet tube 110 to the ground.

In order to bend the bent pipe 120 of the streamlined exhaust connecting pipe 100 from an inlet pipe 110 to a range of 95° or more, or more specifically 95° to 120° range and reach the exhaust gas discharged from the outlet of the turbocharger 10 to the catalytic converter 30 within the shortest time, the length ratio between an inner portion 121 and an outer portion 122 of the bent pipe 120 may be set to 4 or more (e.g., the inner portion length is about 70 mm and the outer portion length is about 282 mm).

Since the inlet pipe 110 of the streamlined exhaust connecting pipe 100 can be easily coupled to the outlet of the turbocharger 10 by using a flange and the rear end portion of the bent pipe 120 is welded to a shell functioning as a housing of the catalytic converter 30, so that the streamlined exhaust connecting pipe 100 bent at an angle of 95° or more, or more specifically 95° to 120° can be easily connected between the outlet of the turbocharger 10 and the catalytic converter 30.

Since the streamlined exhaust connecting pipe 100 has a structure bent at 95° or more, e.g., 95° to 120° range, the exhaust gas exhausted from the outlet of the turbocharger 10 is forced to be exhausted by turning at 95° or more, so that the exhaust pressure due to the exhaust resistance can be increased.

In order to eliminate this exhaust pressure rise, the streamlined exhaust connecting pipe 100 may be provided with an enlarged pipe form in which the inner cross-section area gradually increases from the inlet pipe 110 to the rear end portion of the bent pipe 120.

For example, referring to FIG. 4, by allowing the cross-sectional area 1-2 of the end portion of the bent pipe 120, the cross-sectional area 1-3 of the middle portion of the bent pipe 120 and the cross-sectional area 1-3 of the rear end portion of the bent pipe 120 to gradually increase, based on the cross-sectional area 1-1 of the inlet pipe 110, it is possible to easily prevent the exhaust pressure rise and to induce a flexible flow of the exhaust gas.

The streamlined exhaust connecting pipe 100 is bent to a range of 95° or more, for example, 95° to 120°, so that the catalytic converter 30 connected to the outlet of the streamlined exhaust connecting pipe 100 forms a diagonal arrangement, so that the lower end portion of the catalytic converter 30 is inclined toward the ground compared to the upper portion thereof.

Thus, the oxygen sensor 40 to be inserted into and fastened to the catalytic converter 30 should be erected and inserted into the catalytic converter 30 to be fastened thereto. The catalytic converter 30 is obliquely arranged and inclined toward the ground from the upper end portion to the lower end portion of the catalytic converter 30, so that the insertion fastening length of the oxygen sensor 40 for the catalytic converter 30 cannot be easily secured.

That is, if the catalytic converter 30 is vertical to the ground, the oxygen sensor 40 can be elevated vertically with respect to the catalytic converter 30 to facilitate insertion and fastening in the catalytic converter. Since the catalytic converter 30 is inclined toward the ground from the upper end portion to the lower end portion of the catalytic converter 30 while diagonally arranged, the fastening force of the oxygen sensor 40 may be weakened because the oxygen sensor insertion fastening length for the catalytic converter is not secured.

In view of this, the present disclosure has another feature in that the oxygen sensor 40 can be easily inserted and fastened in a vertical standing state with respect to the inclined catalytic converter 30 by using a boss 200 for fastening the oxygen sensor 40 whose inner surface is processed with a diagonal line.

FIG. 6 shows the boss for fastening the oxygen sensor in the exhaust device for the turbocharged vehicle according to an exemplary embodiment of the present disclosure. FIG. 7 shows the oxygen sensor inserted into and fastened to the catalytic converter using the boss for fastening oxygen sensor according to an exemplary embodiment of the present disclosure.

As shown in FIG. 7, the catalytic converter 30 may include two or more catalysts 31 disposed to be spaced apart from each other, a mat 32 which is in close contact with the outer surface of the catalysts 31 to block the heat of the catalyst and simultaneously support the catalyst, a shell 33 of a case structure covering and protecting the catalyst 31 and the mat 32, and a heat cover 34 mounted on an outer diameter portion of the shell 33 to prevent heat from being radiated to the periphery.

Here, the boss 200 for fastening the oxygen sensor 40 should be inserted into and fastened to the catalyst 31 spaced apart from each other, the reason for this is to be able to detect oxygen in the exhaust gas passing through the catalyst.

Therefore, in the structure of the catalytic converter 30, an insertion hole 35 through which the boss 200 is inserted may be formed through the shell 33.

Particularly, the boss 200 may be provided in a cylindrical shape having an oxygen sensor fastening hole 201 whose inner surface is formed with a diagonal processing surface 202 machined at an angle equal to the diagonal arrangement angle of the catalytic converter 30, and outer surface is formed with a horizontal support surface 203 which a stopper 41 for limiting the insertion length of the oxygen sensor 40 is closely contacted to and supported by.

The diagonal processing angle of the diagonal processing surface 202 of the boss 200 may be equal to the diagonal arrangement angle of the catalytic converter 30.

In addition, due to the diagonal processing surface 202 of the boss 200, a minimum length 204 may be formed at one side of the outer diameter portion of the boss 200 and a maximum length 205 may be formed at the other side of the outer diameter portion.

Particularly, a slanted surface 206 for length increase that is inclined downwardly from the exterior surface portion toward the interior surface portion may be formed at the outer diameter portion of the minimum length 204 of the boss 200.

A stepped groove 207 which is caught on the peripheral end portion 36 of the insertion hole 35 of the catalytic converter 30 may be formed at the outer diameter surface toward the interior surface of the boss 200.

Hereinafter, a process of mounting the boss for fastening the oxygen sensor will be described.

First, the boss 200 is disposed to be inserted into the insertion hole 35 of the catalytic converter 30, and that is, the boss 200 is disposed to be inserted into the insertion hole 35 of the catalytic converter 30 until the peripheral end portion 36 of the insertion hole 35 of the catalytic converter 30 is caught on the step groove 207 of the boss 200.

Next, the boss 200 is mounted by welding along the point where the exterior surface of the peripheral end portion 36 of the catalytic converter 30 meets the outer diameter surface of the boss 200.

At this time, the welding tip may be generated during welding of the boss 200 to be spread while flowing toward the exterior surface of the boss 200, and further, the welding tip flows along the minimum length region 204 of the boss 200 to a horizontal supporting surface 203, so that the outer surface of the horizontal supporting surface 203 may be contaminated with the welding tip.

Accordingly, due to the contaminated welding tip with respect to the horizontal support surface 203, the stopper 41 for limiting the insertion length of the oxygen sensor 40 is not closely contacted with the horizontal support surface 203, so that the oxygen sensor 40 fastening may become impossible due to the contamination of the welding tip.

However, according to the present disclosure, since the slanted surface 206 for length increase inclined downwardly from the rear end portion toward the front end portion is formed in the outer diameter portion of the minimum length 204 of the boss 200, the welding tip does not flow to the horizontal supporting surface 203 but is collected on the slanted surface 206 for the length increase, so that the contamination of the welding tip with respect to the horizontal supporting surface 203 can be easily prevented.

Then, the oxygen sensor 40 is inserted into the oxygen sensor 40 fastening hole 201 of the boss 200 under pressure until the stopper 41 for limiting the insert length of the oxygen sensor 40 is brought into close contact with the horizontal support surface 203 of the boss 200 and fastened thereto, so that the end portion of the oxygen sensor 40 is arranged to be able to sense an oxygen between the catalysts of the catalytic converter 30.

The peripheral end portion 36 of the catalytic converter 30 is inwardly concavely formed by a thickness of the mat to increase the insertion length of the oxygen sensor inserted into the catalytic converter 30, so that the boss 200 is further moved toward the inside of the catalytic converter 30. As a result, the insertion length of the oxygen sensor 40 inserted between the catalysts of the catalytic converter 30 is further increased, so that the oxygen sensor 40 can more easily detect the oxygen in the exhaust gas flowing through the catalytic converter.

As described above, the exhaust connecting pipe connecting the outlet of the turbocharger and the catalytic converter is applied as a streamlined exhaust connecting pipe which is bent at 95° or more from the outlet of the turbocharger toward the ground direction, so that one side of the streamlined exhaust connection pipe and catalyst converter can be more widely secured and the widely secured space can utilize as the layout space of exhaust system components.

Particularly, it is possible to easily fasten the oxygen sensor to the catalytic converter by improving the boss structure for fastening the oxygen sensor inserted into and fastened to the catalytic converter to the structure that the oxygen sensor can be fastened with vertical standing, and also, possible to easily secure the insertion fastening length of the oxygen sensor, thereby ensuring the sensing performance.

Although the present disclosure has been described with reference to exemplary embodiments, it is to be understood that a person skilled in the art may modify and change the elements of the present disclosure within the range of the present disclosure.

In addition, many changes can be made to specific situations or materials within a range that does not deviate from the essential areas of the present disclosure.

The present disclosure, therefore, is not to be limited to the detailed description of the exemplary embodiments of the present disclosure, but will include all embodiments within the scope of the appended claims.

What is claimed is:

1. An exhaust device of a turbocharged vehicle, comprising:
   a catalyst converter diagonally arranged in a vertical direction toward the ground as being connected with an outlet of a streamlined exhaust connecting pipe which is bent at 95° or more,
   wherein the streamlined exhaust connecting pipe is connected between an outlet of the turbocharger and the catalytic converter,
   wherein the catalytic converter has an oxygen sensor, which has a boss, attached to the catalytic converter, and
   wherein the boss fastens the oxygen sensor to the catalytic converter and has a diagonally processed surface, which is parallel to an outer surface of the catalytic converter to be parallel with the ground.

2. The exhaust device of claim 1, wherein the streamlined exhaust connecting pipe comprises:
- an inlet pipe horizontally connected with the outlet of the turbocharger; and
- a bent pipe bent at 95° or more from the inlet pipe toward the ground in the vertical direction.

3. The exhaust device of claim 1, wherein the streamlined exhaust connecting pipe comprises:
- an inlet pipe horizontally connected with the outlet of the turbocharger; and
- a bent pipe bent in a range of 95° to 120° from the inlet pipe toward the ground in the vertical direction.

4. The exhaust device of claim 2, wherein the streamlined exhaust connecting pipe has cross-sectional area gradually increasing from the inlet pipe to an end portion of the bent pipe.

5. The exhaust device of claim 1, wherein the boss for fastening the oxygen sensor has a cylindrical shape having an oxygen sensor fastening hole at a center of the boss,
- wherein the diagonally processed surface of the boss is slanted at the same angle at which the streamlined exhaust connecting pipe bent with respect to the ground, and
- wherein the boss has a horizontal support surface at an exterior surface with and by which a stopper for limiting an insertion length of the oxygen sensor into the catalytic converter is in contact and is supported.

6. The exhaust device of claim 5, wherein, due to the diagonal processed surface of the boss, the boss has a shortest length at one side of an outer diameter portion for fastening the oxygen sensor, and a longest length at another side of the outer diameter portion for fastening the oxygen sensor.

7. The exhaust device of claim 6, wherein the boss further includes a slanted surface slanted downwardly with respect to the ground along the direction from the exterior surface toward the diagonal processed surface.

8. The exhaust device of claim 1,
- wherein the catalytic converter has a shell having an insertion hole through which the boss is inserted, and
- wherein a peripheral end portion of the insertion hole is inwardly concaved as much as the thickness of a mat, which is disposed between the outer surface of catalysts of the catalytic converter and the shell, to increase an insertion length of the oxygen sensor inserted into the catalytic converter.

9. The exhaust device of claim 1, wherein the catalytic converter further includes a stepped groove stepped inward at the peripheral end portion for fastening the oxygen sensor.

* * * * *